United States Patent [19]  
Robak et al.

[11] 4,436,277  
[45] Mar. 13, 1984

[54] TORQUE PINCH VALVE

[76] Inventors: Edward Robak, 5520 San Juan Dr., Orange, Calif. 92669; Carter K. Reh, 13312 Loretta Dr., Santa Ana, Calif. 92705

[21] Appl. No.: 291,616

[22] Filed: Aug. 10, 1981

[51] Int. Cl.³ .............................................. F16K 7/06
[52] U.S. Cl. .......................................... 251/6; 251/9
[58] Field of Search .......................... 251/6, 7, 8, 9, 10, 251/5; 222/101, 528

[56] References Cited

U.S. PATENT DOCUMENTS

| | | | |
|---|---|---|---|
| 2,167,952 | 8/1939 | Jordan | 251/7 |
| 2,285,974 | 6/1942 | Huber | 251/8 X |
| 2,841,357 | 7/1958 | Little | 251/6 |
| 3,016,915 | 1/1962 | Moeller, Jr. | 251/9 X |
| 3,018,793 | 1/1962 | Aagaard | 251/5 X |
| 3,197,173 | 7/1965 | Taubenheim | 251/6 |
| 3,289,999 | 12/1966 | Konzak | 251/6 |
| 3,410,517 | 11/1968 | Wall | 251/6 |
| 3,450,153 | 6/1969 | Hildebrandt | 251/9 X |
| 3,511,468 | 5/1970 | Young | 251/6 |
| 3,734,133 | 5/1973 | Little et al. | 251/6 X |
| 3,847,370 | 11/1974 | Engelsher | 251/6 |
| 4,038,982 | 8/1977 | Burke et al. | 604/65 |
| 4,261,388 | 4/1981 | Shelton | 251/6 X |
| 4,339,897 | 7/1982 | Thompson et al. | 251/5 X |

OTHER PUBLICATIONS

RKL, Sales Literature.  
Red Valve Products, Sales Literature.  
Flexible Valve Corp., Sales Literature.  
Gorman-Rupp, Sales Literature.

Primary Examiner—Martin P. Schwadron  
Assistant Examiner—Sheri Novack  
Attorney, Agent, or Firm—Fischer, Tachner & Strauss

[57] ABSTRACT

There is disclosed a pinch valve of greatly improved performance. The pinch valve has a housing with end plates having apertures forming a through passageway to receive a flexible conduit. The housing is split through the apertures of the end plates, into two halves, forming upper and lower saddles that are detachably interconnected to permit assembly of the housing about a flexible conduit, thereby eliminating cutting or breaking of the flexible conduit to insert or to relocate the pinch valve. The upper half of the housing carries a stationary bar or anvil and a circular cam actuator moves the valve member through a complete, 360 degree, rotation in a sinusoidal action movement. This action gives the valve a great mechanical advantage at shutoff position, permitting use of a small, lightweight valve structure.

14 Claims, 8 Drawing Figures

TORQUE PINCH VALVE

BACKGROUND OF THE INVENTION
1. Field of the Invention

This invention relates to a pinch valve and, in particular, to a pinch valve of low mass which is capable of developing a very large closing force.

2. Brief Statement of the Prior Art

Pinch valves are frequently used for specialized applications such as for the handling of highly corrosive liquids, suspensions of errosive solids, or for sanitary applications where the process fluid cannot be contacted directly with a valve and its mechanical components.

Typically, pinch valves are provided with flanged ends for attachment in the process line and have flexible conduits which are surrounded by wear boots. An actuator drives a mechanism against the wear boot, pinching the flexible conduit closed and, for this purpose, a massive drive structure is commonly employed. Generally, pneumatic or hydraulic actuators must be used to develop the large closing forces required when the valve is to be used on lines of 2 inches or greater diameters.

BRIEF STATEMENT OF THE INVENTION

This invention comprises a small, lightweight pinch valve which can be installed or relocated on a flexible conduit without cutting or breaking the conduit. The valve uses a sinusoidal actuator that moves in a single rotary direction between open and closed positions, thereby minimizing wear on the conduit and avoiding plugging of the conduit when slurries are handled.

The pinch valve has a housing with end plates having through apertures that provide a passage through the housing. The housing is split into two halves transversely through the apertures of the end plates, thereby forming upper and lower saddle members that can be assembled about the flexible conduit. This permits installation or relocation of the pinch valve without breaking the flexible conduit or interrupting the process flow through the conduit. One of the housing halves carries a stationary bar or anvil and the other half carries the actuator and the movable valve member which pinches the flexible conduit against the stationary anvil. Preferably the latter is fixedly adjustable to permit use of the valve for throttling flow.

The valve member is a cylindrical sleeve mounted with bearings onto circular cams which impart a sinusoidal action to the actuator whereby maximum force and minimum travel is generated at closure of the valve. Shear or scuffing movement on the surface of the flexible conduit is precluded by the free rotational mounting of the circular valve member.

BRIEF DESCRIPTION OF THE DRAWINGS

The invention will be described with reference to the figures of which.

DESCRIPTION OF THE PREFERRED EMBODIMENT

Figure 1:
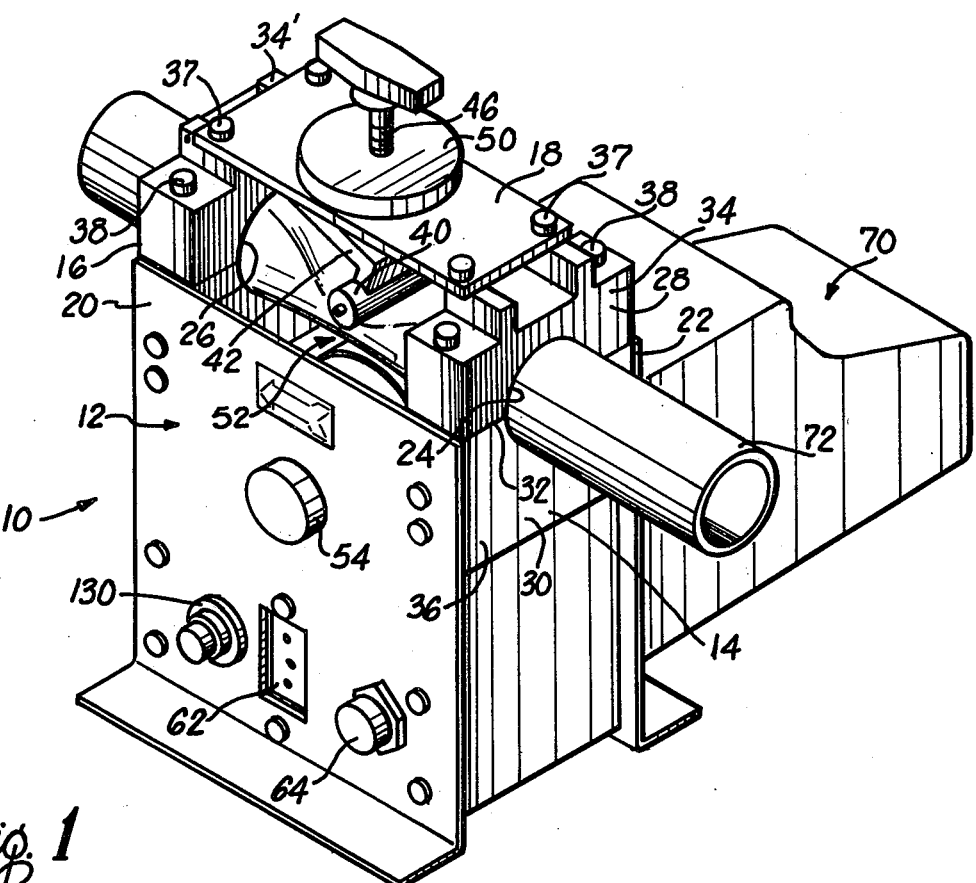
FIG. 1 is a perspective view of the pinch valve of the invention.

Referring now to FIG. 1, the invention is shown as a pinch valve 10 which has a housing 12 defined by end plates 14 and 16 which are secured to a top beam 18, and side plates 20 and 22, thereby defining a housing which contains the valve mechanism. The end plates 14 and 16 have centrally located through apertures 24 and 26 and are split into two halves such as 28 and 30 by slits such as 32 that traverse the apertures, thereby forming an upper saddle block 34 and a lower saddle block 36 from each of the end plates. The two upper saddle blocks 34 and 34' are interconnected by the top beam 18 secured thereto by screw 37, and are detachably secured to their respective lower saddle blocks by fastening means such as machine screws 38.

The beam 18 carries the stationary rod or anvil 40 which is preferably secured to the free end of arm 42 that is hinged to the underside of the beam. The position of the anvil bar 40 is fixedly adjustable vertically by the lead screw 46 which is threadably received in an internally threaded aperture of the beam 18 and which projects beneath its undersurface to provide an abutment stop at its lower end for the anvil bar 40. The position of this lead screw 46 can be fixedly secured by lock nut 50 that is threadably engaged on lead screw 46.

The pinch valve has a movable valve member generally indicated at 52 which is mounted on a circular cam actuator. The actuator is rotatably mounted in the housing by bearings journalled in each side plate 20 and 22 and covered by end cover 54. The drive source for moving the valve member through the actuator mechanism preferably comprises an electrical motor, which is secured to sidewall 22 and housed within cover 70.

The sidewall 20 can be provided with a connector plug such as 62 for attachment of a power supply electrical conductor and the device is preferably provided with a connector jack 64 for attachment of a remote control unit. An electrical fuse receptacle 130 can also be provided on sidewall 20.

Figure 2:
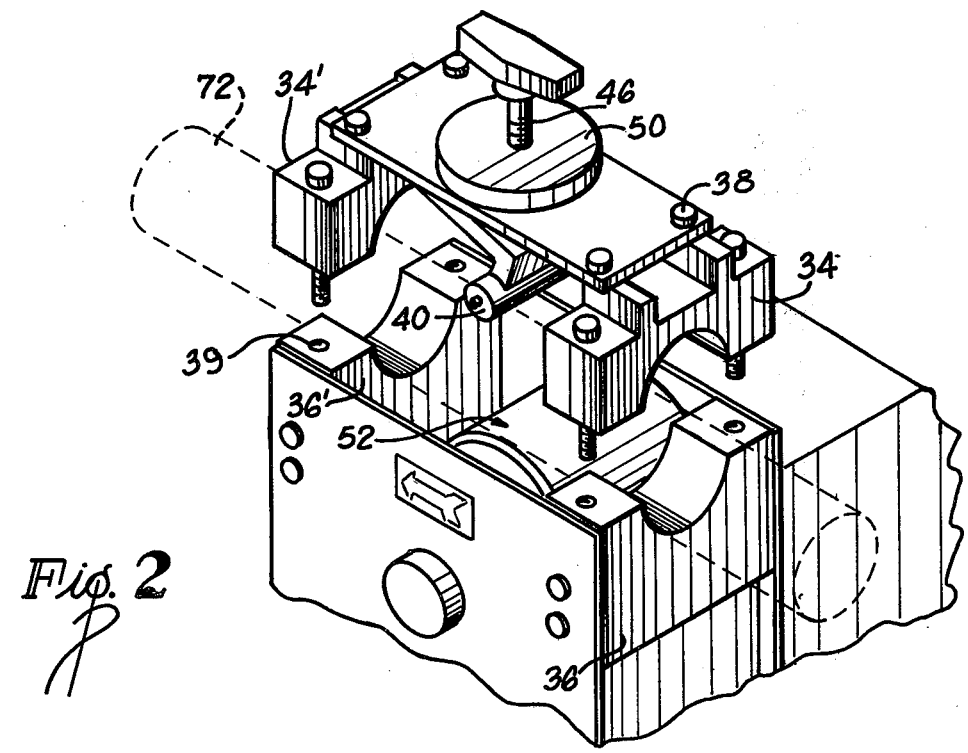
FIG. 2 is an exploded view illustrating placement of the pinch valve on a flexible line.

Referring now to FIG. 2, the method of installing and/or relocating the pinch valve assembly on a flexible line will be described in greater detail. As shown in FIG. 2, the upper saddle block assembly comprising the two upper saddle blocks 34 and 34' interconnected by the upper beam 18, can be readily removed from the lower half of the valve by loosening the four machine screws 38. Thereafter, the user simply raises the upper saddle block assembly as illustrated in FIG. 2, exposing the through passageway of the valve, and places a flexible conduit 72 (shown in phantom lines) into the open, through passageway, resting on the lower saddle blocks 36 and 36'. The valve should be in the open position in this installation, with the valve member 52 retracted from the flexible conduit. The user need only locate the pinch valve in the desired location along flexible line 72 and replace the upper saddle block assembly by inserting and tightening the four machines screws 38 into their threaded receiving apertures 39 located in each of the lower saddle blocks 36 and 36'. The user can then position the stationary or anvil bar 40 to the appropriate position for either throttling or closing the flow through the pinch valve when the valve actuator is urged to close the valve member. This is accomplished by moving the valve member to its closed position advancing lead screw 46 to move the anvil bar 40 downwardly until the desired throttled flow or closed flow condition exists. Thereupon, the lock nut 50 is tightened to secure the lead screw in its proper position and repeated actuation of the valve moves the valve member into and out of the desired flow controlling position.

Figure 3:
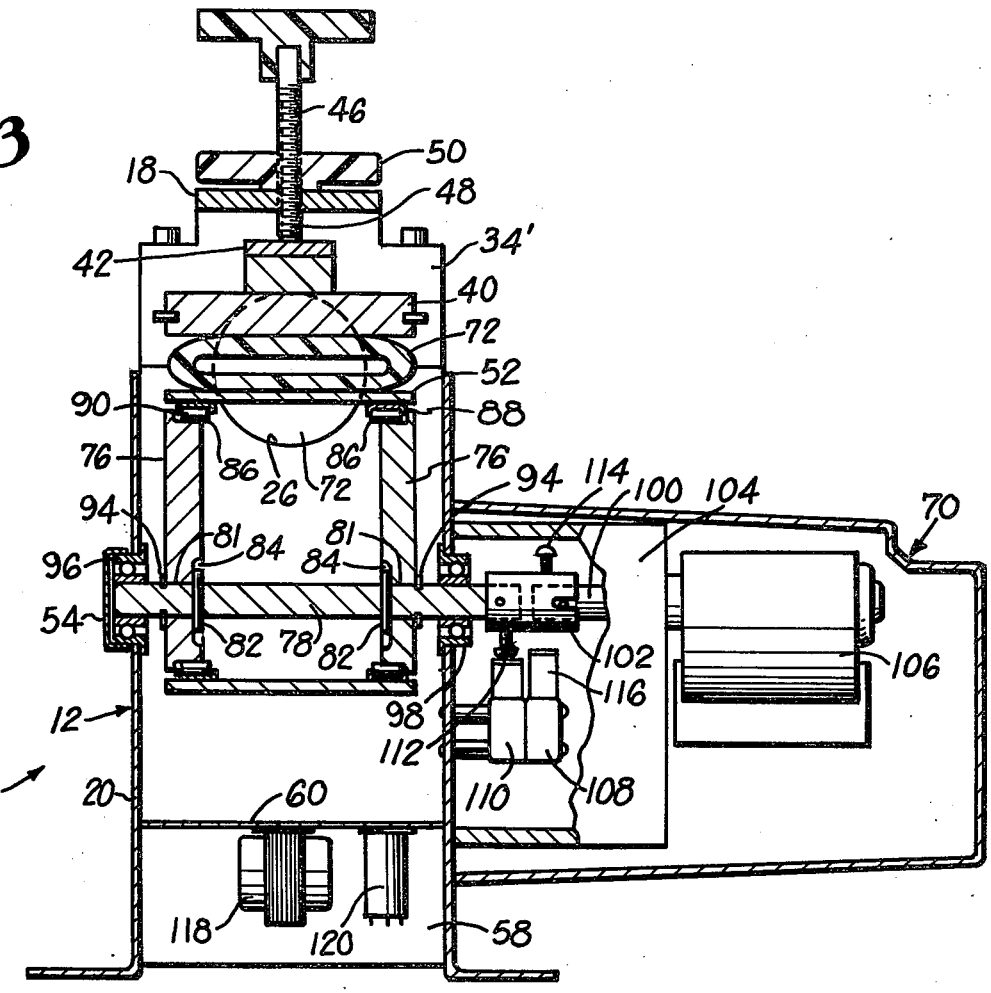
FIG. 3 is an elevated sectional view of the pinch valve of the invention.

Referring now to FIG. 3, the pinch valve 10 is shown in a elevational sectional view. As illustrated, the valve is in a flow throttling position with flexible conduit 72 compressed between the stationary or anvil bar 40 and the valve closure member, circular sleeve 52. The view illustrates the rearward upper saddle block 34' with its aperture 26 for receiving the flexible tubing 72. This view also shows a section through the upper beam 18, the lock nut 50 and the lead screw 46 with its lower end 48 that serves at the abutment stop for the arm 42.

The valve closure member, circular sleeve 52, is mounted with needle bearings 86 to circular cams 76 which are mounted on the actuator drive shaft 78. The circular cams have aligned eccentric bores 80 and 81 that are received over shaft 78, and are keyed to this shaft against angular rotation by roll pins 82 which are received in through bores of shaft 78 and which fit into radial slots 84, on the inside faces of the circular cams 76.

Two sets of needle bearings 86 are press fitted into opposite ends of the circular sleeve 52 and these bearings are received about the edges of the circular cams 76. The bearings 86 are mounted in races 88 which are retained by annular rims 90 about the periphery of each of the circular cams 76. The assembly of circular cams 76 is secured on shaft 78 against axial movement by suitable means such as retaining clips 94.

The actuator shaft 78 is received in roller bearings 96 and 98, respectively supported by sidewalls 20 and 22. The actuator drive shaft 78 is interconnected to the power supply shaft 100 by coupling member 102 which is keyed to these shafts by conventional means, not shown. The power supply shaft depends from a conventional gear train assembly 104 that is connected at the input end to the drive shaft of motor 106.

Motor 106 is preferably an electrical motor and the pinch valve of the invention has an electrical control circuit which includes a pair of microswitches 108 and 110 that are mounted in the assembly in juxtaposition to coupling 102. The latter is provided with two set screws, 112 and 114, which are located on opposite sides of coupling 102 and which project into actuating positions to the switch levers, such as 116, of the microswitches 108 and 110.

The housing 12 is subdivided into a subjacent chamber 58 by the transverse horizontal partition 60 and the electrical components such as transformer 118 and relay 120 are located in the subjacent chamber 58.

Figure 4:
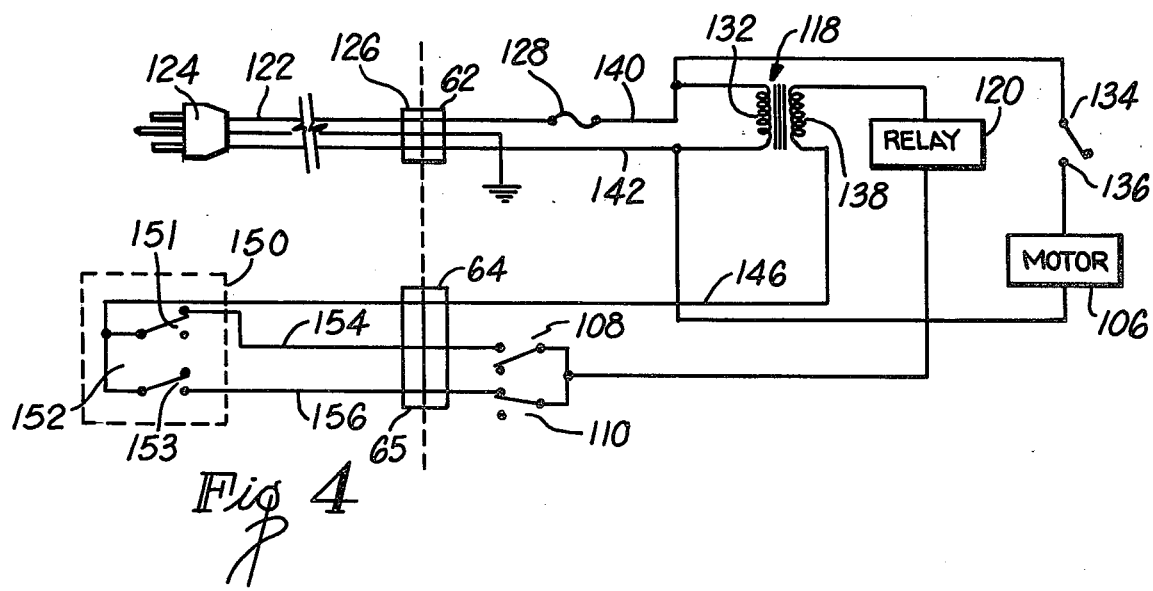
FIG. 4 is an electrical schematic of the control circuit for the valve.

Referring now to FIG. 4, the electrical control circuit will be described. The power supply cord 122 is provided with a conventional three-prong male plug 124 for connection to an electrical outlet and is interconnected to the control unit through the connector plug assembly consisting of a female receptacle 126 which interconnects with a male plug 62 carried on the inside sidewall 20 of the valve 10. The electrical circuit includes a safety fuse 128 which preferably is contained within a fuse receptacle 130 (shown in FIG. 1) on the sidewall 20 of the valve 10. The main power supply is connected directly across the primary windings 132 of transformer 118 and to the switch contacts 134 and 136 of the relay 120. The windings of motor 106 are in circuit with the power supply lines 140 and 142 through the switch of relay 120 in the illustrated manner.

The secondary windings 138 of transformer 118 are in circuit with the actuator coil of relay 120 and the pair of normally closed microswitches 108 and 110. The circuit through the secondary windings of transformer 138 and the actuator coil 120 of the relay includes conductor 146 that extends to a remote control unit through the connector jack 64 and its associated female receptacle plug 65, which are connected at the sidewall 20 of the valve 10; see FIG. 1.

The remote control unit of the electrical control circuit comprises a hand-held control box 150 that contains a conventional double-pole, double-throw switch 152. The microswitch 108 is connected to one side of switch 151 of the switch poles through the connector 154 and the other microswitch is connected to the opposite side of the other switch 153 by conductor 156.

The switches 152 and microswitches 108 and 110 together form a make and break control circuit in which the manual movement of switch 152 to either of its positions, completes a circuit through the secondary windings 138 of transformer 118 and its respective microswitch 108 or 110. A circuit can be completed through the manual switch 152, conductor 156, and microswitch 110. This actuates the relay 120, closing the relay contacts 136, and energizing motor 106 which moves the control valve actuator to its closed position. Upon reaching the closed position, (as shown in FIG. 3), the abutment screw 112 engages the switch lever 116' of the microswitch 110. This opens the normally closed microswitch and breaks the circuit through the secondary winding 138 of the transformer, deenergizing the motor and stopping movement of the valve actuator. This movement, however, releases switch lever 116 of microswitch 108 and permits the normally closed microswitch to move to its closed position thereby and motor 106 can be again energized by reversal of the lever of switch 152. In this manner, an intermittent or make and break operation of motor 106 is achieved which is effective in moving the valve actuator between and open and closed, or throttling positions.

Figure 6:
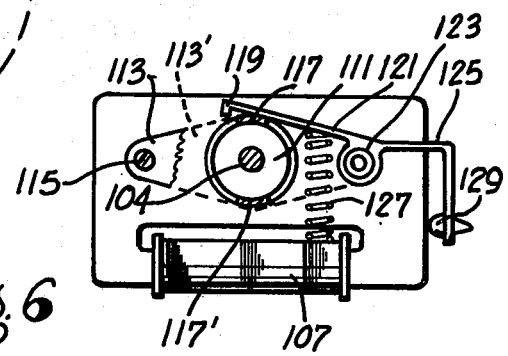
FIG. 6 illustrates the motor and its integral braking system.

The valve drive system incorporates brake means effective to prevent coasting of the valve actuator after the motor is deenergized. Preferably a conventional motor and brake means is provided such as shown in FIG. 6. This motor has a field coil 107 with a conventional motor stack 109 of iron plates with a motor armature 111, on shaft 104 which is rotatably mounted in bearings (not shown) which are journalled in end plates 113, one of which is shown in cut-away view in FIG. 6. The end plates are secured in the assembly by machine screws 115. The brake means includes a pair of brake tangs 117 and 117' which project from the peripheral edge of armature 111 at 180 degree spacing. A brake pawl 119 is distally carried by brake arm 121 which is mounted on bushing 123 that is pivotally mounted to the motor stack 109. An armature arm 125 also extends from bushing 123 is juxtaposition to the side of the motor stack 109 and a bumper 129 is distally carried by the armature arm. The brake arm is resiliently biased by spring 127, counterclockwise as viewed, to engage pawl 119 with the opposing tang 117, braking rotation of motor armature 111 and shaft 104.

When the field coil 107 is energized, armature arm 125 moves to the illustrated position against the bias of tension spring 127, releasing tang 117 and armature 111 for rotation. In this fashion, precise positioning of the motor armature and shaft 104 is achieved.

Figure 5:
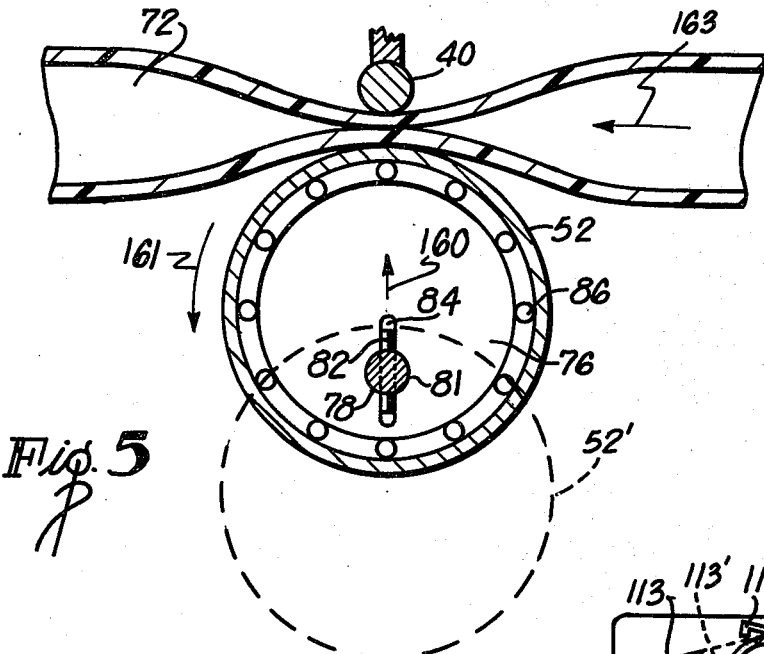
FIG. 5 illustrates the closing action of the valve member.

An important feature of the present invention is the unidirectional movement of the actuator. The actuator is moved through a complete rotation as it travels from open to closed to open positions. It moves in a single rotary direction, e.g., counterclockwise as shown by the arrowhead arc line 161 of FIG. 5. This direction is selected so that its tangential component along the conduit 72 is in the direction of flow through conduit 72.

Another important feature of the invention is the sinusoidal action of the actuator which imposes a closing force on the flexible conduit that is entirely perpendicular to the axis of the flexible conduit, without any scuffing or shear forces applied to the surface of the conduit. This operation is described in greater detail in reference to FIG. 5 where a partial elevational view of the actuator is shown. As illustrated, the stationary anvil bar 40 provides an upper stop for the conduit 72. The valve member 52 is rotatably mounted on the circular cam assembly of the circular cams 76 by a plurality of needle bearings 86. The circular cams are mounted on shaft 78 with eccentrically located apertures 81. The circular valve member 52 is shown in its most recessed position by the phantom lines 52'. Upon initial rotation of the valve closure and actuator assembly from the position shown in the phantom lines at 52', the actuator will move with its greater velocity and minimal force. As the closure member 52 reaches its closing position, shown in the solid lines, it will be vertically displaced along the arrowhead line 160 at minimal velocity and maximum force from the drive motor 106. Since the circular sleeve 52 is freely rotatable on the assembly of circular cams 76, after it engages flexible conduit 72 it ceases to move relative to the conduit. Instead circular cams 76 rotate within the circular sleeve 52. The circular sleeve 52 is thus pressed upwardly against the conduit 72 and does not move relative to the surface of this conduit, avoiding any scuffing or dragging against the outer surface of the conduit.

Figure 7:
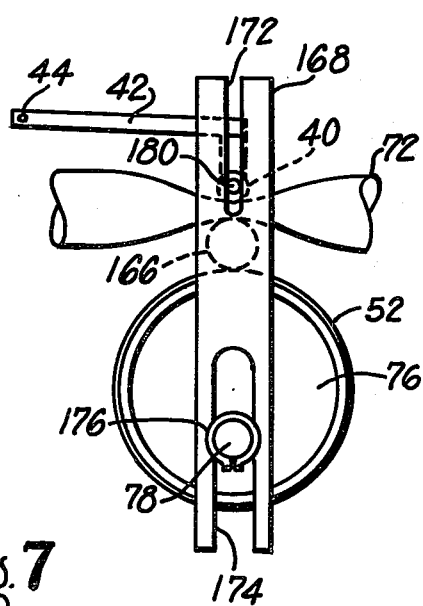
FIG. 7 is a side elevational view of an alternative embodiment of the valve member of the invention.
Figure 8:
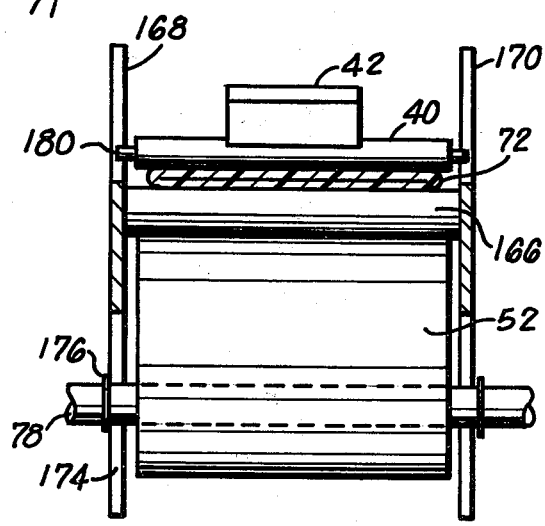
FIG. 8 is a view along lines 8—8 of FIG. 7.

In some applications, particularly with large diameter lines, it is desirable to concentrate the closing force around a valve member having a minimal surface area of engagement with the flexible conduit. This is particularly desirable for high pressure applications or for applications using relatively large diameter conduits. An embodiment of the invention which is shown in FIGS. 7 and 8 is preferably employed for this application. As there shown, the flexible conduit 72 is engaged between the upper, stationary anvil bar 40 that is carried on the arm 42 which is hinged to the undersurface of beam 18 at axis 44, all in the manner previously described. Similarly, the valve closure member 52 is a cylindrical sleeve and is received on the assembly of circular cams 76, again all as previously described. In the embodiment shown in FIGS. 7 and 8, however, the valve closure member is a cylindrical rod 166 that is mounted between the opposite standards 168 and 170. The opposite ends of each of the standards 168 and 170 are slotted at 172 and 174. Slots 174 in the lower ends of the standards 168 and 170 are received over the actuator shaft 78 and are retained thereon by suitable means such as C-clips 176. With this assembly, the lower bar or actuator 166 bears against the outer surface of cylindrical sleeve 52 and is free to move up and down in response to rotation of the assembly of the circular cams 76 and the cylindrical sleeve 52 mounted thereon. As the rod 166 is moved upwardly, it deflects the sidewall of flexible conduit 72 inwardly until it reaches the closed position shown in FIGS. 7 and 8. Suitable pin means 180 can be provided on the ends of stationary anvil rod 40 to be received in the upper slots 172 of each of the standards 168 and 170, thereby maintaining alignment of the H-bar assembly of the standards 168 and 170 and the closure bar 166.

The pinch valve assembly of the invention provides a number of beneficial results and advantages. The valve is applicable for high force pinching of varied diameter lines from small to large flexible tubings and utilizes a sinusoidal acting valve closure member which provides minimal movement and maximum torque at the throttling or closed position of the valve, permitting the use of small and compact drive units while, nevertheless, producing the necessary high forces for use with large tubing or high pressure applications. The valve housing is provided in two halves whereby the housing can be readily disassembled for removal or relocation on a flexible tubing. The flexible tubing can be received within the valve housing without any need for breaking or cutting of the flexible tubing, thereby permitting installation of the valve on a process line without interruption of the process.

The pinch valve utilizes a freely rotatable circular valve closure member which provides minimal wear on the flexible tubing since no shear or scuffing forces are applied to the external surface of the tubing. This insures maximum life of the tubing. In its preferred embodiment, the pinch valve is provided for remote operation utilizing a simple electrical control circuit. The pinch valve of the invention provides a fixedly adjustable anvil bar whereby the valve can be operated as a full closure or throttling valve.

The valve operator movement is unidirectional with the eccentric actuator always moving in the direction of the flow when opening. This insures that the line pressure assists in opening of the valve. The closing motion of the valve actuator is not abrupt, but, rather, the valve actuator squeezes closed with its velocity of movement progressively decreasing as it moves towards the closed position. This gradual closing avoids any water hammer effects and also insures that particles are not trapped in the pinched area since the gradual closing of the valve with the resultant progressive decrease in flow area through the flexible tubing results in increasing flow velocity which sweeps the particles from the progressively constricting area between the pinch bars.

The valve assembly can be used for single or multiple tubes in the manner illustrated and can be used for a full shut off or throttling control of processed fluids. It is extremely compact and portable and can be readily assembled and disassembled from process lines.

The invention has been described with reference to the illustrated and presently preferred embodiment. It is not intended that this description of the presently preferred and illustrated embodiment be unduly limiting of the invention. Instead, it is intended that the invention be defined by the means, and their obvious equivalents set forth in the following claims.

What is claimed is:

1. A pinch valve comprising:

(a) a housing formed of upper and lower half housings, having distal and opposite ports and a flexible conduit extending therebetween to form a fluid passageway through said housing, (b) a pinch bar attached to an arm pivotally attached to the inside top wall of said upper half housing and a lead screw engaged in a threaded aperture in said top wall to provide an adjustment abutment stop for said arm; and (c) a valve member movably mounted to the lower half housing with actuator means to urge said valve member between an open position permitting unobstructed flow through said conduit and a throttling position constricting said flexible conduit between said valve member and anvil means, whereby said valve is operable to control rate of flow and to shut off flow, as determined by the adjustable position of said anvil means.

2. The valve of claim 1 wherein said pinch bar is secured to said upper half housing and is transverse thereto.

3. The valve of claim 1 wherein said fixedly adjustable means comprises a lead screw engaged in a threaded aperture in said top wall.

4. The valve of claim 3 wherein said pinch bar is attached to an arm pivotally attached to the inside top wall of said upper half housing and said lead screw is an adjustable abutment stop for said arm.

5. The valve of claim 1 wherein said actuator is circular cam means eccentrically and fixedly mounted on an actuator shaft which is rotatably mounted in the lower half housing and said valve member is a cylindrical sleeve rotatably carried on said circular cam means.

6. A pinch valve comprising:

(a) a housing formed of upper and lower half housings, having distal and opposite inlet and outlet ports and a flexible conduit extending therebetween to form a fluid passageway through said housing;

(b) anvil means laterally traversing said housing and fixedly mounted to support means within said upper half housing adjacent an intermediate position of said flexible conduit within said upper half housing;

(c) a valve member movably mounted to the lower half housing with actuator means including circular cam means eccentrically and fixedly mounted on an actuator shaft which is rotatably mounted for complete, 360 degree, rotation in the lower half housing; and (d) a cylindrical sleeve rotatably carried on said circular cam means;

(e) needle bearing means captured between said circular cam means and said cylindrical sleeve;

(f) power means to rotate said actuator shaft and urge the valve member unidirectionally into and out of its throttling position in the direction of flow through said flexible conduit, away from said inlet and towards said outlet port.

7. The pinch valve of claim 6 wherein said valve member comprises a cylindrical sleeve rotatably carried on said circular cam means.

8. The valve of claim 7 including needle bearing means captured between said circular cam means and said cylindrical sleeve.

9. The valve of claim 6 wherein said circular cam means is a pair of spaced apart circular cams having aligned and eccentrically located apertures to receive said shaft and said cylindrical sleeve extends between and is distally received over said cams.

10. The valve of claim 9 wherein said circular cams have slots on their inside faces, traversing said eccentrically located apertures with pins keyed to said shaft and received in said slots to fixedly secure said cams to said shaft.

11. The valve of claim 10 including axial stops fixedly attached to said shaft to secure said cams against said pins.

12. The valve of claim 9 wherein each of said cams has an annular lip about its outer edge to serve as an axial stop for needle bearing means.

13. The valve of claim 6 wherein said needle bearing means is press fitted into said sleeve.

14. The valve of claim 5 including a pair of upright standards, one each located at each end of said cylindrical sleeve and having longitudinal guide slots, one at each end thereof, and receiving stationary guide means and a movable pinch bar distally secured to and extending between said standards whereby said movable pinch bar is urged towards said flexible conduit by said sleeve.

* * * * *